United States Patent Office 2,757,210

Patented July 31, 1956

2,757,210

COUPLING OF CONJUGATED OLEFINS AND ALCOHOLS BY HYDROXYL FREE-RADICALS

Edward L. Jenner, Wilmington, Del., assignor to E. I. du Pont de Nemours and Company, Wilmington, Del., a corporation of Delaware No Drawing. Application February 25, 1952, Serial No. 273,345

15 Claims. (Cl. 260—635)

This invention relates to certain new aliphatic difunctional hydroxyl-containing compounds and to a new process for the additive coupling of ethylenically unsaturated compounds to provide aliphatic difunctional hydroxyl-containing compounds.

Polyfunctional compounds have achieved considerable importance in technical organic chemistry. For example, glycols have utility in such applications as in the preparation of polymers or in the modification of polymers when employed in the formulation of plasticizing materials. A new process for the production of glycols, and particularly of the higher aliphatic glycols, would have considerable importance. Glycols which contain a further functional group such as provided by unsaturation stemming from carbon in addition to the hydroxyl groups would provide versatility and potential applications for further reactions to give modified products.

It is an object of this invention to provide a new and improved process for the coupling of ethylenically unsaturated compounds.

It is another object of this invention to provide a process for the production of a polyhydroxy aliphatic compound by the coupling of ethylenically unsaturated compounds having conjugated unsaturation.

It is a further object to provide a new type of glycols which have the general formula $$HO—R—(C_4H_5X)—(C_4H_5X)—R—OH$$

wherein X is hydrogen, halogen or alkyl of 1 to 6 carbons and R is a saturated divalent hydrocarbon radical of 2 to 6 carbons in which the two unsatisfied valences are attached to different carbons. The structure of the diene unit of the particularly preferred compounds is $—CH_2—CX=CH—CH_2—$, whereby compounds of the structure $$HO—R—(CH_2—CX=CH—CH_2)—(CH_2—CH=CX—CH_2)—R—OH$$

are obtained.

Other objects of the invention will appear hereinafter.

The objects of this invention may be accomplished by reacting a polymerizable ethylenically unsaturated compound containing conjugated unsaturation with an aliphatic alcohol having hydrogen attached to carbon which is not directly attached to a hydroxyl group in the presence of hydroxyl free-radicals.

In the practice of this invention, any ethylenically unsaturated compound subject to addition polymerization and having conjugated unsaturation may be employed. Particularly useful are ethylenic compounds of three to eight carbon atoms, including styrene, acrylonitrile, 1,3-butadiene, 2-chloro-1,3-butadiene, and isoprene. In general, the diene hydrocarbons and monohalogenated hydrocarbons of four to five carbon atoms, for example, butadiene, isoprene and chloroprene are most useful.

The aliphatic alcohols employed are those which have hydrogen attached to a carbon, which carbon does not have attached thereto a hydroxyl group. Alcohols that are free from other active groups are generally used to preclude any major amounts of products other than the polyhydric alcohols being formed. Propylene glycol and hexamethylene glycol, allyl alcohol, and pentanediol are useful in this reaction. Particularly preferred are the mono-hydroxy, saturated alkanols of two to six carbons, including ethanol, propanol, iso- or n-butanol and n-hexanol. An alcohol which has no hydrogen on carbon other than on a carbon bearing the hydroxyl does not enter into this reaction to give the desired type of product. Generally, the alcohols employed possess water solubility ranging from 0.5% to 3% or more. The alcohol is present in the reaction mixture generally in quantities equivalent to the amount of unsaturated compound and may be present in an excess of from two up to one hundred times or more of the weight of the polymerizable ethylenically unsaturated compound.

The hydroxyl free-radical employed in the reaction of this invention is suitably provided by generating it from an inorganic peroxide that will yield hydrogen peroxide under acidic conditions or from hydrogen peroxide itself and a reducing agent such as an inorganic salt having oxidizable ions of a metal of Series 4 of the Periodic Table and of atomic number 22 to 26, for example, a substance yielding ferrous, titanous, or vanadous ions. An alternative method for furnishing hydroxyl radicals is by employing radiant energy on hydrogen peroxide in water. A further method is by the use of oxygen with ferrous (+2) or cerous (+3) ions. To obtain efficient use of the hydroxyl free-radicals, it is desirable that their relative concentration in the reaction mixture be low at any time in view of their high activity and short life. Accordingly, the aqueous solutions containing the peroxide and the reducing agent, that is, oxidizable ions, are preferably added gradually and mixed in the reaction mixture in the presence of the alcohol and unsaturated compound. The total amount of hydroxyl free-radicals supplied to the reaction mixture may vary between wide limits, preferably, however, they should be supplied in molar ratios of said unsaturated compound to hydroxyl radical of between 1:1.5 and 5:1.

Aqueous systems are employed in view of the ease of obtaining the hydroxyl radical in such systems. The amount of water present can be varied within wide limits. The optimum amount of water used is dependent upon the specific reactants employed. In general, the ratio of water to organic compounds in the reaction mixture can be varied from as low as 0.1:1 to ratios of the order of 100:1.

The aqueous reaction mixture is preferably acidic, that is, the pH of the reaction media is generally below 7.0 and preferably below 2.0.

The reaction time is not critical but generally fifteen minutes or more is required for the addition of the hydroxyl free-radical generating solution to the organic compounds. Temperatures are dependent upon the particular system used and generally vary from e. g., —30° C. to 100° C. However, the preferred temperature is of the order of —10° C. to 25° C.

The following examples, in which parts are by weight illustrate this invention.

EXAMPLE I

*t.-Butyl alcohol and butadiene*

To a solution of 50 parts of sulfuric acid and 585 parts of t.-butyl alcohol in 1500 parts of water there were added simultaneously and equivalently 108 parts of 1,3-butadiene, a solution of 34 parts of hydrogen peroxide in 130 parts of water, and a solution of 101 parts of sulfuric acid and 278 parts of ferrous sulfate heptahydrate in 575 parts of water. The mixture was vigorously agitated and held at a temperature of 5° C. during the fifteen minutes required for the addition of the reactants. Two phases were present at the end of the addition. These were separated, the aqueous phase was extracted three times with ether, and the combined ether extract and organic phase was treated with sodium bicarbonate solution to remove acidic materials. The ether and starting materials were then distilled, and the distillation was continued to a pot temperature of 45° C. at 13 millimeters of pressure. The light-colored, viscous liquid remaining consisted of 87 parts (a 69% yield based on the hydrogen peroxide and ferrous sulfate employed). This material is a 16-carbon glycol containing two double bonds and was formed by the combination of two t.-butyl alcohol residues (i. e., molecules from each of which one hydrogen atom had been extracted) and two butadiene molecules.

Calc'd. for $C_{16}H_{30}O_2$: C, 75.53%; H, 11.89%; Iodine No.,199.6; M. W., 254. Found: C, 71.98%; H, 11.46%; Iodine No., 202.1; M. W., 250. The infrared absorption spectrum of this product showed hydroxyl groups and carbon-carbon double bonds.

A sample of unsaturated glycol was hydrogenated at room temperature to give the corresponding saturated glycol. The latter was distilled in a molecular still at 70° C./0.02 mm. The saturated glycol was obtained in two fractions; the minor one, distilled first, was a viscous, colorless liquid; $n_D^{25}=1.4570$. The major product was obtained as a white crystalline solid.

Calc'd. for $C_{16}H_{34}O_2$: C, 74.35%; H, 13.25%; M. W. 258. Found: C, 73.91%; H, 13.34%; M. W., 254.

EXAMPLE II

*n-Butyl alcohol and butadiene*

To a mixture of 50 parts of sulfuric acid and 202 parts of n-butyl alcohol in 2200 parts of water, there were added as described in the previous example 108 parts of butadiene and aqueous solutions containing 278 parts of ferrous sulfate heptahydrate, 101 parts of sulfuric acid, and 34 parts of hydrogen peroxide. The product was isolated as in the previous example and consisted of a pale yellow liquid, b. p. greater than 70° C./1 mm. (48% yield based on hydrogen peroxide and ferrous sulfate). This material is an unsaturated $C_{16}$-glycol.

Calc'd. for $C_{16}H_{30}O_2$: C, 75.53%; H, 11.89%; M. W. 254. Found: C, 73.14; H, 12.09; M. W. 278.

EXAMPLE III

*Isopropyl alcohol and butadiene*

To a solution containing 50 parts of sulfuric acid and 585 parts of isopropyl alcohol in 1500 parts of water there were added 108 parts of butadiene and solutions containing 278 parts of ferrous sulfate, 101 parts of sulfuric acid, and 34 parts of hydrogen peroxide in the manner described above. The product obtained was 14.8 parts of a pale, viscous liquid (13% yield based on hydrogen peroxide and ferrous sulfate).

Calc'd. for $C_{14}H_{26}O_2$: C, 74.28%; H, 11.58%; M. W. 226. Unsaturation Equivalent (quantitative hydrogenation), 113. Found: C, 72.21%; H, 11.27%; M. W., 230; Unsaturation Equivalent, 127.

EXAMPLE IV

*Cyclohexanol and butadiene*

To a mixture of 50 parts of sulfuric acid, 232 parts of cyclohexanol and 2200 parts of water there were added 108 parts of butadiene and solutions containing 278 parts of ferrous sulfate, 101 parts of sulfuric acid, and 34 parts of hydrogen peroxide as described above. The unsaturated glycol obtained corresponded to 81.2 parts (53% yield based on hydrogen peroxide and ferrous sulfate).

Calc'd. for $C_{20}H_{34}O_2$: C, 78.38%; H, 11.18%; M. W., 306; Unsaturation Equivalent (Quantitative hydrogenation), 153. Found: C, 73.05%; H, 10.97%; M. W., 324. Unsaturation Equivalent, 196.

EXAMPLE V

*t.-Butyl alcohol and chloroprene*

To a solution of 585 parts of t.-butyl alcohol and 50 parts of sulfuric acid in 1500 parts of water there were added 95 parts of chloroprene and aqueous solutions containing 278 parts of ferrous sulfate, 101 parts of sulfuric acid, and 34 parts of hydrogen peroxide. This reaction was conducted at a temperature of 25° C. The product was extracted with ether and the ether extracts stabilized by addition of 0.01 part of phenothiazine. The ether and starting materials were distilled up to a pot temperature of 80° C. at 1 mm. The product, obtained as a still residue, was a fairly viscous reddish liquid. It consisted of 123.5 parts (76.5% yield, based on hydrogen peroxide and ferrous sulfate). This product is an unsaturated glycol containing two t.-butyl alcohol residues and two units from chloroprene.

Calc'd. for $C_{16}H_{28}O_2Cl_2$: C, 59.44%; H, 8.73%; Cl, 21.93%; M. W. 323. Found: C, 59.95%; H, 8.64%, Cl, 20.17%; M. W. 350.

EXAMPLE VI

*Ethanol and butadiene*

To a solution of 50 parts of sulfuric acid and 500 parts of water in 1578 parts of ethanol there were added 108 parts of butadiene and solutions containing 278 parts of ferrous sulfate heptahydrate, 101 parts of sulfuric acid, and 34 parts of hydrogen peroxide in the manner described in Example I. During the addition, ferrous sulfate precipitated. The supernatant liquid was decanted and treated with 2000 parts of ether. The resulting organic phase was separated and washed twice with aqueous sodium carbonate. The distillation of the ether and ethanol solution to a pot temperature of 90° C./1 mm. yielded the unsaturated glycol (8 parts) as the still residue.

The unsaturated glycol was combined with that obtained from two additional runs and hydrogenated with palladium catalyst to give a saturated glycol. This glycol distilled at 136–138° C./0.8 mm.

Calc'd. for $C_{12}H_{26}O_2$: C, 71.23%; H, 12.95%. Found: C, 70.96%; H, 12.92%.

EXAMPLE VII

*t.-Butyl alcohol and acrylonitrile*

To a solution of 779 parts of t.-butyl alcohol and 50 parts of sulfuric acid in 1500 parts of water, there were added 53 parts of acrylonitrile, 69 parts of t.-butyl alcohol, 34 parts of hydrogen peroxide, 278 parts of ferrous sulfate heptahydrate, and 98 parts of sulfuric acid in the manner described in Example I. The mixture was held at a temperature of 30° C. during the 15 minutes required for the addition. The reaction mixture was extracted with ether and then with methyl ethyl ketone. The combined extracts were treated with sodium bicarbonate to remove acid, and the solvents were distilled. The distillation was conducted to a pot temperature of 60° C. at 1 mm. pressure. The residue comprised 68 parts (a 54% yield based on the hydrogen peroxide). This material is principally the dihydroxydinitrile containing two acrylonitrile residues and two fragments resulting from the removal of a hydrogen atom from t.-butyl alcohol.

Calcd. for $C_{14}H_{24}O_2N_2$: C, 66.63%; H, 0.58%; N, 11.10%. Found: C, 63.51%; H, 9.19%; N, 10.25%.

The coupled products which contain a plurality of alcoholic hydroxyl groups are isolated by any suitable technique, depending upon the properties of the products obtained. In general, the isolation involves extraction of a product from the water and inorganic materials present. Distillation, solvent extraction, or, in some instances, crystallization or precipitation can be employed in the isolation and purification of the products obtained. The coupled products obtained are represented by the general formula Y—M—M—Y, wherein M is the unit of polymerizable ethylenically unsaturated monomer such as butadiene and Y is a group, derived by the removal of a hydrogen from the alcohol, such as $—C_4H_8OH$ when a butanol is employed.

EXAMPLE VIII

*t.-Butyl alcohol and isoprene*

To a solution of 779 parts of t.-butyl alcohol and 50 parts of sulfuric acid in 1500 parts of water, there were added 68 parts of isoprene, 117 parts of t.-butyl alcohol, 34 parts of hydrogen peroxide, 278 parts of ferrous sulfate heptahydrate, and 98 parts of sulfuric acid in the manner described above. The mixture was held at a temperature of 30° during the period required for the addition. The organic layer which formed during the reaction was separated and the aqueous phase extracted twice with ether. The organic fractions were washed with aqueous sodium carbonate solution and dried over anhydrous sodium sulfate. The ether was distilled and the distillation continued under reduced pressure to a pot temperature of 70° under 1 mm. pressure. The residue comprised 65 parts (a 46% yield based on hydrogen peroxide). This material is mainly the glycol containing two isoprene units and two fragments resulting from the removal of a hydrogen atom from t.-butyl alcohol.

Calcd. for $C_{18}H_{34}O_2$: C, 76.54; H, 12.13; M. W., 282.4. Hydrogenation Equivalent 141.2. Found: C, 72.32; H, 11.78; M. W. 258. Hydrogenation Equivalent 131.8.

When dienes such as butadiene, chlorobutadiene, or isoprene are employed in this reaction the product obtained is a new glycol having the formula

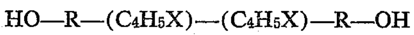

$$HO—R—(C_4H_5X)—(C_4H_5X)—R—OH$$

wherein X is hydrogen, halogen, or alkyl of 1 to 6 carbons, and R is a saturated divalent hydrocarbon radical of 2 to 6 carbons. The halogen may be chlorine, fluorine, bromine, or iodine, and the alkyl group may be methyl, ethyl, propyl, etc. Compounds which have the general structural formula

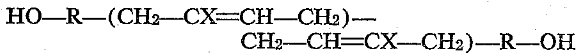

$$HO—R—(CH_2—CX{=}CH—CH_2)—CH_2—CH{=}CX—CH_2)—R—OH$$

result from the reaction of this invention when the diene unit employed is $—CH_2CX{=}CH—CH_2—$. Butadiene which gives compounds of the structure

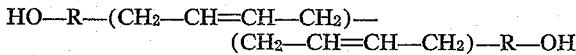

$$HO—R—(CH_2—CH{=}CH—CH_2)—(CH_2—CH{=}CH—CH_2)—R—OH$$

is preferred in view of its economy, availability and reactivity. The divalent saturated hydrocarbon radicals of 2 to 6 carbons are attached to the alcoholic hydroxyl and the diene units by different carbons. Examples of these radicals are $—CH_2CH_2—$, $—C(CH_3)_2CH_2—$, and the cyclohexenyl diradical. Compounds containing the isobutenyl diradical, derived from tertiary butyl alcohol, are generally obtained in the highest yields and therefore preferable.

The products obtained by the process of this invention are useful in the preparation of polymers, for example, by reaction with dibasic acids to give polymeric esters. The polyhydroxy compounds obtained by the process of this invention are useful in the preparation of plasticizers for polymers, for example, upon esterification with monobasic acids. They are also useful as intermediates for the preparation of other organic compounds. The presence of unsaturation within the molecule of the polyhydroxy products of this invention provide means for further reaction, for example, hydrogenation, halogenation, and oxidation to give valuable products, particularly from those products which have ethylenic unsaturation.

Reference in the specification and claims to parts, proportions, and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

I claim:

1. A process for the additive coupling of polymerizable ethylenically unsaturated compounds which comprises reacting in an aqueous system in the presence of hydroxyl free-radicals a polymerizable ethylenically unsaturated compound having conjugated unsaturation with an aliphatic alcohol having hydrogen attached to a carbon atom which is not directly attached to a hydroxyl group.

2. A process for the additive coupling of polymerizable ethylenically unsaturated compounds which comprises reacting in an aqueous system in the presence of hydroxyl free-radicals a polymerizable ethylenically unsaturated compound of four to eight carbon atoms having conjugated unsaturation with an aliphatic alcohol having hydrogen attached to a carbon atom which is not directly attached to a hydroxyl group.

3. A process for the additive coupling of polymerizable ethylenically unsaturated compounds which comprises reacting in an aqueous system in the presence of hydroxyl free-radicals a polymerizable ethylenically unsaturated diene hydrocarbon of four to five carbon atoms having conjugated unsaturation with an aliphatic alcohol having hydrogen attached to a carbon atom which is not directly attached to a hydroxyl group.

4. A process for the additive coupling of polymerizable ethylenically unsaturated compounds which comprises reacting in an aqueous system in the presence of hydroxyl free-radicals a polymerizable ethylenically unsaturated compound having conjugated unsaturation with a monohydroxy, saturated alcohol of two to six carbon atoms.

5. A process for the additive coupling of polymerizable ethylenically unsaturated compounds which comprises reacting in an aqueous acidic system in the presence of hydroxyl free-radicals a polymerizable ethylenically unsaturated compound having conjugated unsaturation with an aliphatic alcohol having hydrogen attached to a carbon atom which is not directly attached to a hydroxyl group.

6. A process for the additive coupling of polymerizable ethylenically unsaturated compounds which comprises reacting in an aqueous acidic system in the presence of hydroxyl free-radicals butadiene having conjugated unsaturation with an aliphatic alcohol having hydrogen attached to a carbon atom which is not directly attached to a hydroxyl group.

7. A process for the additive coupling of polymerizable ethylenically unsaturated compounds which comprises reacting in an aqueous acidic system in the presence of hydroxyl free-radicals a polymerizable ethylenically unsaturated compound having conjugated unsaturation with a butyl alcohol.

8. A process for the additive coupling of polymerizable ethylenically unsaturated compounds which comprises reacting in an aqueous acidic system in the presence of hydroxyl free-radicals a polymerizable ethylenically unsaturated compound having conjugated unsaturation with tertiary butyl alcohol.

9. A process for the additive coupling of polymerizable ethylenically unsaturated compounds which comprises reacting in an aqueous acidic system in the presence of hydroxyl free-radicals butadiene having conjugated unsaturation with a butyl alcohol.

10. A glycol having the general formula

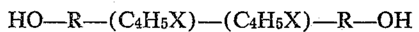

$$HO—R—(C_4H_5X)—(C_4H_5X)—R—OH$$

wherein X is a substituent of the group consisting of hydrogen, halogens and alkyls of 1 to 6 carbon atoms and R is a saturated divalent hydrocarbon radical of 2 to 6 carbon atoms in which the two unsatisfied valences are attached to different carbon atoms.

11. A glycol having the general formula $$HO—R—(CH_2—CH{=}CH—CH_2)—(CH_2—CH{=}CH—CH_2)—R—OH$$

wherein R is a saturated divalent hydrocarbon radical of 2 to 6 carbon atoms and is attached to the alcoholic hydroxyl and the diene unit by different carbon atoms.

12. The glycol having the formula $$HO—C(CH_3)_2CH_2—(CH_2—CH{=}CH—CH_2)—(CH_2—CH{=}CH—CH_2)—CH_2(CH_3)_2C—OH$$

13. A process for the additive coupling of polymerizable ethylenically unsaturated compounds which comprises reacting, in an aqueous system in the presence of a hydroxyl free-radical generating mixture taken from the group consisting of (*a*) hydrogen peroxide and inorganic peroxides capable of yielding hydrogen peroxide under acidic conditions with an inorganic salt having oxidizable ions of a metal from the group consisting of metals of atomic number 22 to 26 inclusive, and (*b*) oxygen with ions from the group consisting of ferrous (+2) and cerous (+3) ions, a polymerizable ethylenically unsaturated compound having a conjugated unsaturation with an aliphatic alcohol having hydrogen attached to a carbon atom which is not directly attached to a hydroxyl group.

14. A process for the additive coupling of polymerizable ethylenically unsaturated compounds which comprises reacting, in an aqueous system in the presence of a peroxide from the group consisting of hydrogen peroxide and inorganic peroxides capable of yielding hydrogen peroxide under acidic conditions and an inorganic salt having oxidizable ions of a metal from the group consisting of metals of atomic number 22 to 26 inclusive, a polymerizable ethylenically unsaturated compound having conjugated unsaturation with an aliphatic alcohol having hydrogen attached to a carbon atom which is not directly attached to a hydroxyl group.

15. A process for the additive coupling of polymerizable ethylenically unsaturated compounds which comprises reacting, in an aqueous system in the presence of oxygen and ions from the group consisting of ferrous (+2) and cerous (+3) ions, a polymerizable ethylenically unsaturated compound having conjugated unsaturation with an aliphatic alcohol having hydrogen attached to a carbon atom which is not directly attached to a hydroxyl group.

References Cited in the file of this patent

UNITED STATES PATENTS

| | | |
|---|---|---|
| 2,223,807 | Milas | Dec. 3, 1940 |
| 2,437,648 | Milas | Mar. 9, 1948 |
| 2,477,621 | Kharasch | Aug. 2, 1949 |
| 2,490,282 | Seubold et al. | Dec. 6, 1949 |
| 2,500,599 | Bergsteinsson et al. | Mar. 14, 1950 |
| 2,528,592 | Hall et al. | Nov. 7, 1950 |
| 2,700,051 | Jenner | Jan. 18, 1955 |

OTHER REFERENCES

Milas et al.: J. A. C. S., vol. 68 (1946), pgs. 205–8.

Kharasch et al.: J. Org. Chem., vol. 16 (1951) pgs. 1556–65.